US011919132B2

(12) United States Patent
Marty et al.

(10) Patent No.: US 11,919,132 B2
(45) Date of Patent: Mar. 5, 2024

(54) SHOWER BASE INSTALLATION SYSTEM

(71) Applicant: Delta Faucet Company, Indianapolis, IN (US)

(72) Inventors: Garry Marty, Fishers, IN (US); Charles Hettrick, Westfield, IN (US)

(73) Assignee: Delta Faucet Company, Indianapolis, IN (US)

( * ) Notice: Subject to any disclaimer, the term of this patent is extended or adjusted under 35 U.S.C. 154(b) by 81 days.

(21) Appl. No.: 17/503,895

(22) Filed: Oct. 18, 2021

(65) Prior Publication Data

US 2023/0118409 A1 Apr. 20, 2023

(51) Int. Cl.
*B25B 27/14* (2006.01)
*A47K 3/40* (2006.01)

(52) U.S. Cl.
CPC ................ *B25B 27/14* (2013.01); *A47K 3/40* (2013.01)

(58) Field of Classification Search
CPC B25B 27/14; B25B 27/16; A47K 3/40; B66F 15/00; B66F 19/005; Y10T 24/318; B65G 7/12
USPC .......................................... 269/131; 254/131
See application file for complete search history.

(56) References Cited

U.S. PATENT DOCUMENTS 1,245,216 A 11/1917 Gohlke
3,895,398 A * 7/1975 Mustee ................. A47K 3/284 4/613
5,388,878 A 2/1995 Smith
5,983,760 A * 11/1999 Clarke ................... A63C 17/06 81/436
7,293,759 B2 * 11/2007 Beach ................... B66F 19/005 254/131
7,516,591 B2 4/2009 Wolner et al.
7,533,430 B2 * 5/2009 Moxey .................. E04H 17/265 254/131
8,567,760 B2 10/2013 Sindt
D762,107 S 7/2016 French
D772,036 S 11/2016 Frassetto
9,657,486 B2 5/2017 Raymond
10,323,367 B2 6/2019 Martelle
D883,766 S 5/2020 Montes et al.
D887,229 S 6/2020 Merritt
2011/0113566 A1 5/2011 Holbrook
2014/0259551 A1 * 9/2014 Egbert ...................... A45F 3/14 24/302

(Continued)

FOREIGN PATENT DOCUMENTS

CN 211057777 7/2020

OTHER PUBLICATIONS

Truini, Pulling Up Patio Pavers, retrieved on May 11, 2021 from https://www.thisoldhouse.com/patios/21019247/pulling-up-patio-pavers, 2 pages.

(Continued)

*Primary Examiner* — Janie M Loeppke
(74) *Attorney, Agent, or Firm* — Bose McKinney & Evans LLP

(57) ABSTRACT

A shower base installation system including a shower base and shower base installation tool. The shower base includes one or more recesses on the bottom surface. The installation tool includes a handle, a strap, and a hook. The tool is used to lift and maneuver a shower base into position by engaging the hook into one of the recesses in the shower base.

20 Claims, 8 Drawing Sheets

(56) References Cited

U.S. PATENT DOCUMENTS

| | | | | |
|---|---|---|---|---|
| 2016/0206156 | A1* | 7/2016 | Smith | A47K 3/40 |
| 2016/0214838 | A1 | 7/2016 | McCoy | |
| 2019/0061125 | A1 | 2/2019 | Schulz | |
| 2020/0000290 | A1* | 1/2020 | Baba | A47K 3/40 |
| 2020/0039042 | A1* | 2/2020 | Gibson | B25B 27/06 |
| 2020/0247718 | A1 | 8/2020 | Thomas et al. | |

OTHER PUBLICATIONS

Sliding Systems, Inc., Str2 Lower Strap with Small Flat-Hook, retrieved on May 11, 2021 from https://slidingsystems.com/2in-lower-strap-with-small-flat-hook, 2 pages.

Sevigny, Two Simple Tools for Flatwork, retrieved on May 11, 2021 from https://thewoodfiredenthusiast.com/two-simple-tools-for-flatwork, 5 pages.

* cited by examiner

SHOWER BASE INSTALLATION SYSTEM

BACKGROUND AND SUMMARY OF THE DISCLOSURE

The present disclosure generally relates to a shower base system including an installation tool to install relatively heavy shower bases. In particular, the present disclosure provides a tool including a handle, a strap, and a hook that engages in any one of a number of recesses in the bottom of a shower base to allow lifting and maneuvering of the shower base into position.

Lightweight shower bases molded from a polymer are known in the art for use with shower enclosures. However, shower bases made from a heavy material like ceramics may cause difficulty during positioning and installation. Depending on the layout of the shower enclosure, there may be little room for an installer's hands to adjust the base into position. Additionally, any adhesive applied to the sub-floor may be wiped off if the base is laid down and slid into place, instead of being lowered into position.

As such, there remains a need for an installation tool that allows for easy manipulation and installation of a heavy shower base into a wall cavity or shower enclosure.

A shower base installation system is disclosed including a shower base and a shower base installation tool. The illustrative shower base includes one or more recesses formed on a bottom edge. The illustrative installation tool includes a handle, a strap, and a hook. The hook and strap are illustratively coupled together through the use of openings. The tool is used to lift and maneuver a shower base into position by engaging the hook into the recesses in the bottom edge of the base. Once in position, tension is removed from the strap, and the strap can be disassembled from the hook leaving the hook in place with the shower base, if desired.

According to an illustrative embodiment of the present disclosure, a shower base installation tool includes a handle, a flexible strap having a top end and a bottom end, and a hook. The hook includes a shank extending between an upper end and a lower end, an angled return leg, a bend that defines an inwardly facing crook and couples the lower end of the shank with the return leg, and an opening at the top end of the shank. The top end of the strap is coupled to the handle. The bottom end of the strap is inserted through the opening of the hook.

According to another illustrative embodiment of the present disclosure, a shower base is configured to cooperate with a shower base installation tool and includes a body. The body includes a first peripheral edge, a second peripheral edge coupled to the first peripheral edge, an upper surface extending between the first peripheral edge and the second peripheral edge, and a lower surface extending substantially parallel to the upper surface. At least one recess is formed in at least one of the first peripheral edge and the second peripheral edge. The recess includes an opening extending upwardly from the lower surface of the body to an upper edge at a distance less than the upper surface of the body, and an angled surface extending from the upper edge of the opening and angled upwardly toward the upper surface of the body.

According to another illustrative embodiment of the present disclosure, a shower base installation system includes a shower base installation tool and a shower base. The shower base installation tool includes a handle, a flexible strap having a top end and a bottom end, and a hook. The hook includes a shank extending between an upper end and a lower end, an angled return leg, a bend that defines an inwardly facing crook and couples the lower end of the shank with the return leg, and an opening at the top end of the shank. The top end of the strap is coupled to the handle. The bottom end of the strap is inserted through the opening of the hook. The shower base includes a body with a first peripheral edge, a second peripheral edge extending perpendicular to the first peripheral edge, an upper surface extending between the first peripheral edge and the second peripheral edge, and a lower surface extending substantially parallel to the upper surface. At least one recess is formed in at least one of the first peripheral edge and the second peripheral edge. The recess includes an opening extending upwardly from the lower surface of the body to an upper edge at a distance less than the upper surface of the body, and an angled surface extending from the upper edge of the opening and angled upwardly toward the upper surface of the body. The inwardly facing crook of the hook engages the angled surface of the at least one recess in the base.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description of exemplary embodiments when taken in conjunction with the accompanying drawings, wherein.

DETAILED DESCRIPTION OF THE DRAWINGS

Figure 1:
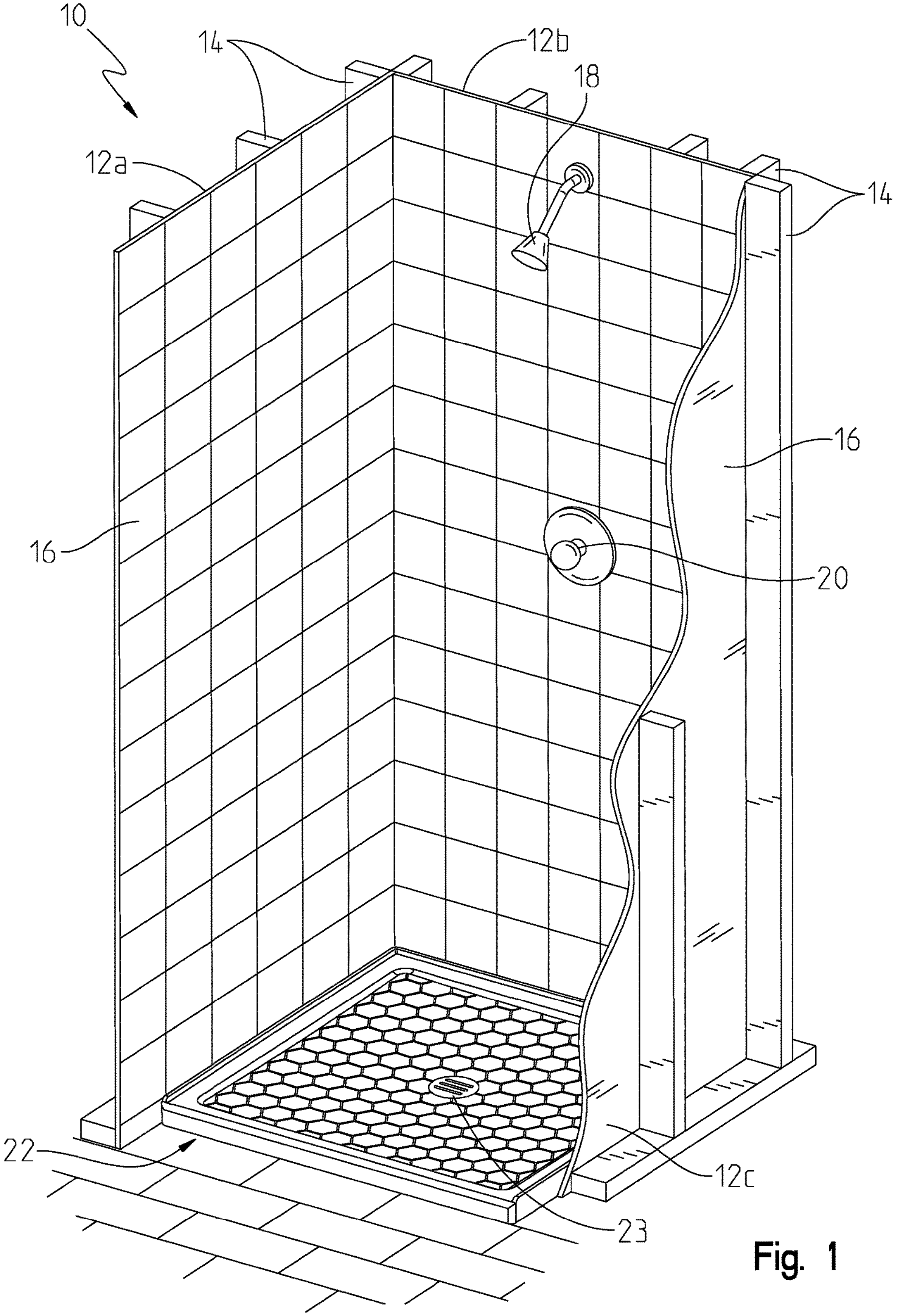
FIG. 1 is a perspective view of an illustrative shower enclosure with a shower base installed.

For the purposes of promoting an understanding of the principles of the present disclosure, reference will now be made to the embodiments illustrated in the drawings, which are described herein. The embodiments disclosed herein are not intended to be exhaustive or to limit the invention to the precise form disclosed. Rather, the embodiments are chosen and described so that others skilled in the art may utilize their teachings. Therefore, no limitation of the scope of the claimed invention is thereby intended. The present invention includes any alterations and further modifications of the illustrated devices and described methods and further applications of principles in the invention which would normally occur to one skilled in the art to which the invention relates.

With reference initially to FIG. 1, a shower enclosure 10 is shown as including a first shower wall 12*a*, a second shower wall 12*b*, and a third shower wall 12*c*. First shower wall 12*a* is perpendicular to second shower wall 12*b*, and third shower wall 12*c* is perpendicular to second shower wall 12*b*. First shower wall 12*a* and third shower wall 12*c* are opposing and in parallel spaced relation to each other. Each shower wall 12*a*, 12*b*, 12*c* illustratively includes mounting studs 14 supporting a planar substrate 16, such as a molded panel depicting tile. While shower enclosure 10 illustratively includes three walls 12*a*, 12*b*, 12*c*, it should be appreciated that other types of shower enclosures may be substituted therefore. For example, shower enclosure 10 may be a corner enclosure including two perpendicular walls (not shown).

Overhead shower 18 directs water into shower enclosure 10. A user may regulate water flow to overhead shower 18 through a conventional control valve 20. A shower base 22 fits within first shower wall 12*a*, second shower wall 12*b*, and third shower wall 12*c* at the bottom of shower enclosure 10. Shower base 22 includes a drain 23 to allow water from overhead shower 18 to evacuate shower enclosure 10. In an illustrative embodiment, shower base 22 is made from a ceramic material. In one illustrative embodiment, the shower base 22 may be of a material composition similar to the type detailed in US Patent Application Publication No. 2020/0247718 to Thomas et al., the disclosure of which is expressly incorporated herein by reference. It should be appreciated that other conventional materials, such as polymers, cast iron, etc., may be used for the shower base 22.

Figure 2:
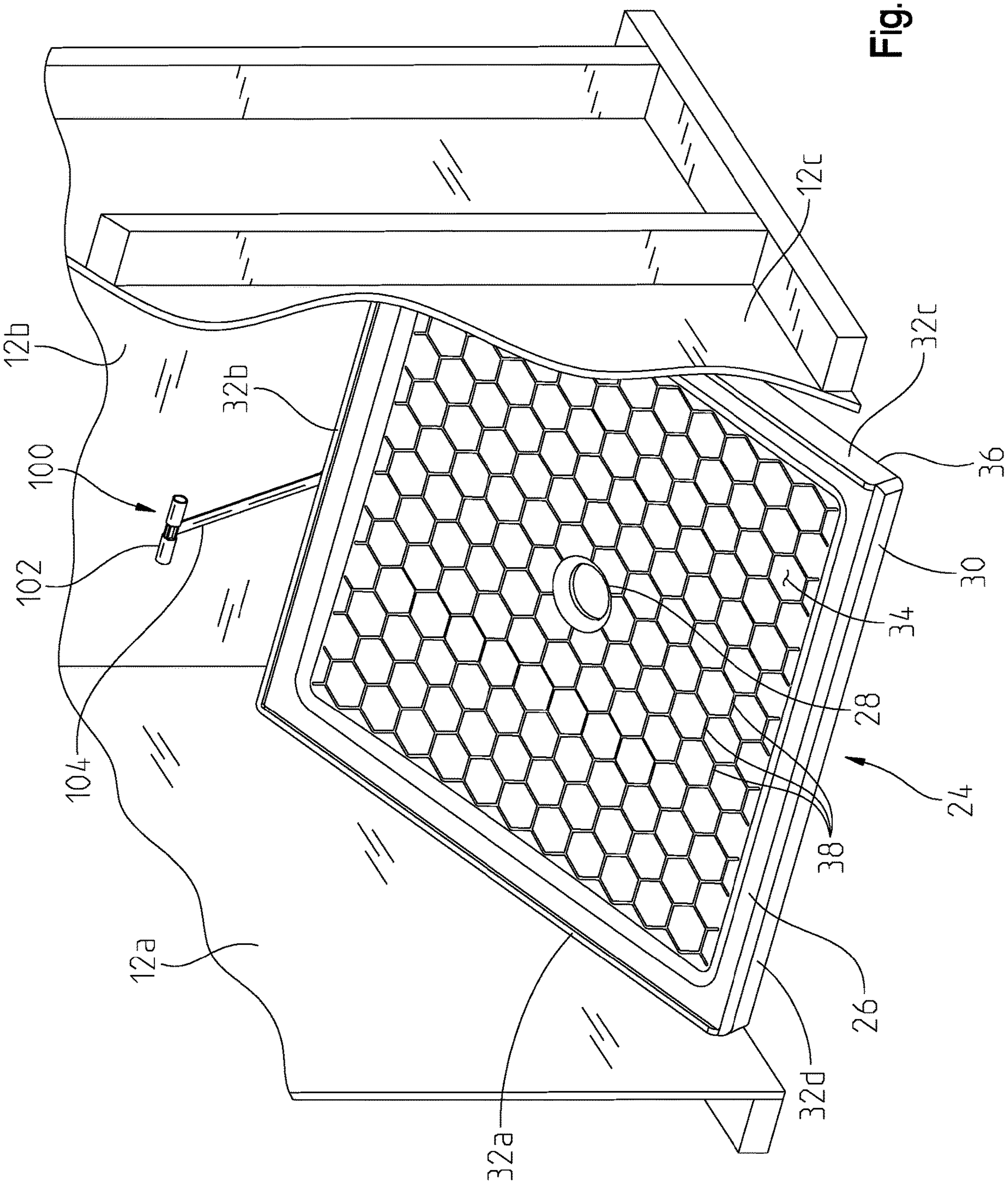
FIG. 2 is a perspective view of the shower base of FIG. 1 being installed with an illustrative shower base installation tool in accordance with the present disclosure.
Figure 3:
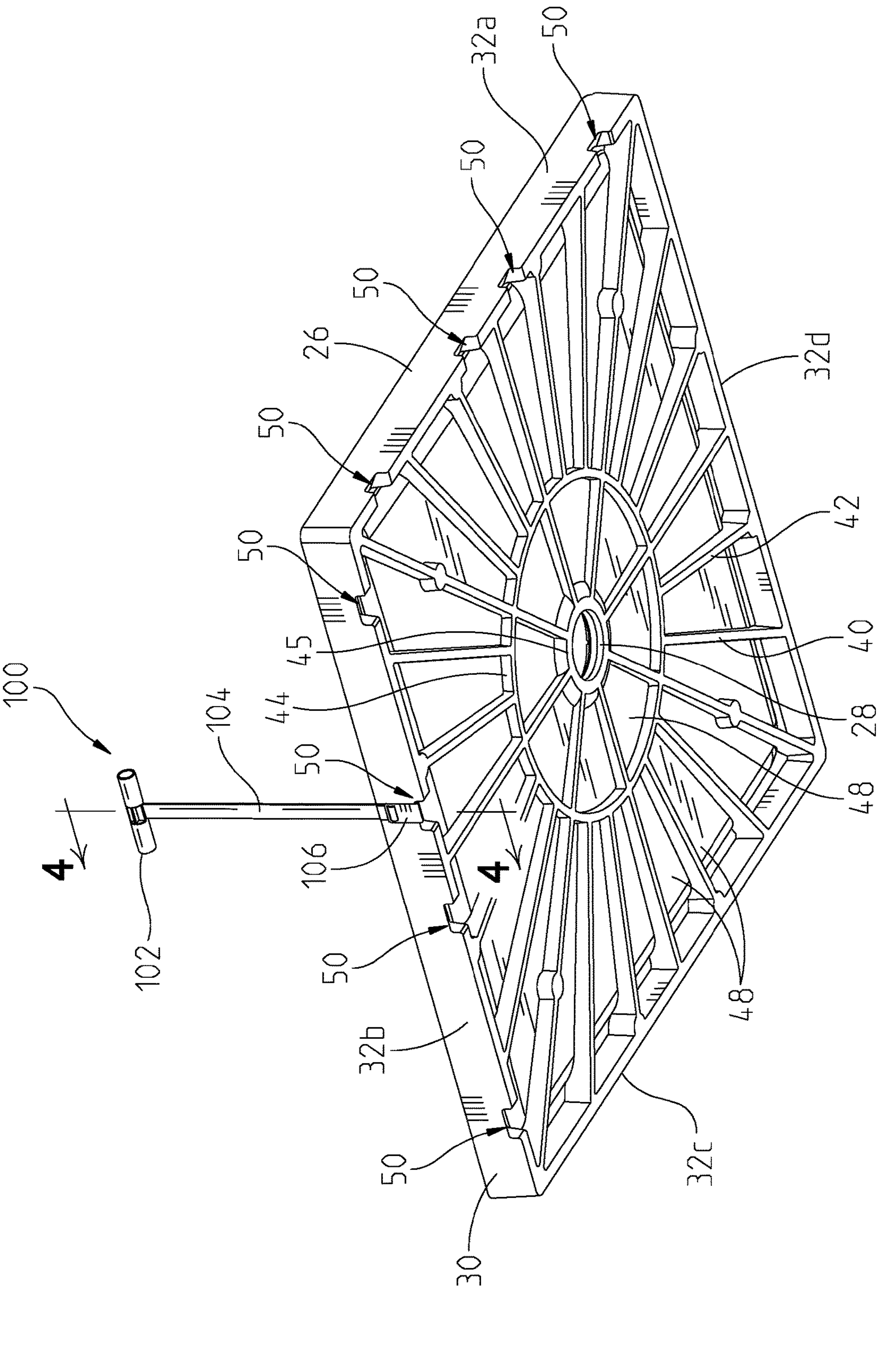
FIG. 3 is a bottom perspective view of the installation tool and the shower base of FIG. 2.

As shown in FIGS. 2-3, shower base 22 includes a body 26 with an upper surface 34 and a lower surface 36. Upper surface 34 illustratively includes a decorative textured pattern 38. Illustratively, textured pattern 38 is shown as a hexagonal design, but could be other shapes and/or patterns. Shower base 22 includes a center opening 28 extending through body 26 from upper surface 34 through lower surface 36 for drain 24 to be installed.

Body 26 includes a shower base periphery 30 defined by a first peripheral edge 32*a*, a second peripheral edge 32*b*, a third peripheral edge 32*c*, and a fourth peripheral edge 32*d*. The shower base periphery 30 illustratively forms a rectangular shape, although other shapes may be substituted therefore. There is a very small clearance defining a sealant gap (approximately about 0.25 inches or less) between first peripheral edge 32*a*, second peripheral edge 32*b*, and third peripheral edge 32*c* of shower base periphery 30 and first shower wall 12*a*, second shower wall 12*b* and third shower wall 12*c*, respectively, when shower base 22 is installed in shower enclosure 10. This tight fit leaves little to no room for a user's hands to manipulate shower base periphery 30 during installation of shower base 22.

With reference to FIG. 3, illustrative shower base 22 includes recesses 50 on lower surface 36 around at least a portion of shower base periphery 30. Recesses 50 may be molded into the shower base 22, or formed via other conventional methods such as machining. Lower surface 36 is illustratively defined by a plurality of strengthening ribs 40. Illustratively, strengthening ribs 40 include radially extending ribs 42 from the center of shower base 22 toward shower base periphery 30, a first or outer circular rib 44, and a second or inner circular rib 45. A plurality of recesses 48 are defined between adjacent strengthening ribs 40. The number, size and positioning of ribs 42 may vary, particularly based upon the size and shape of body 26, and position of drain opening 28.

The installation tool 100 of the present disclosure is configured to cooperate with shower base 22, and illustratively includes a handle 102, a strap 104, and a hook 106. More particularly, hook 106 engages with recesses 50 on shower base 22.

Figure 4:
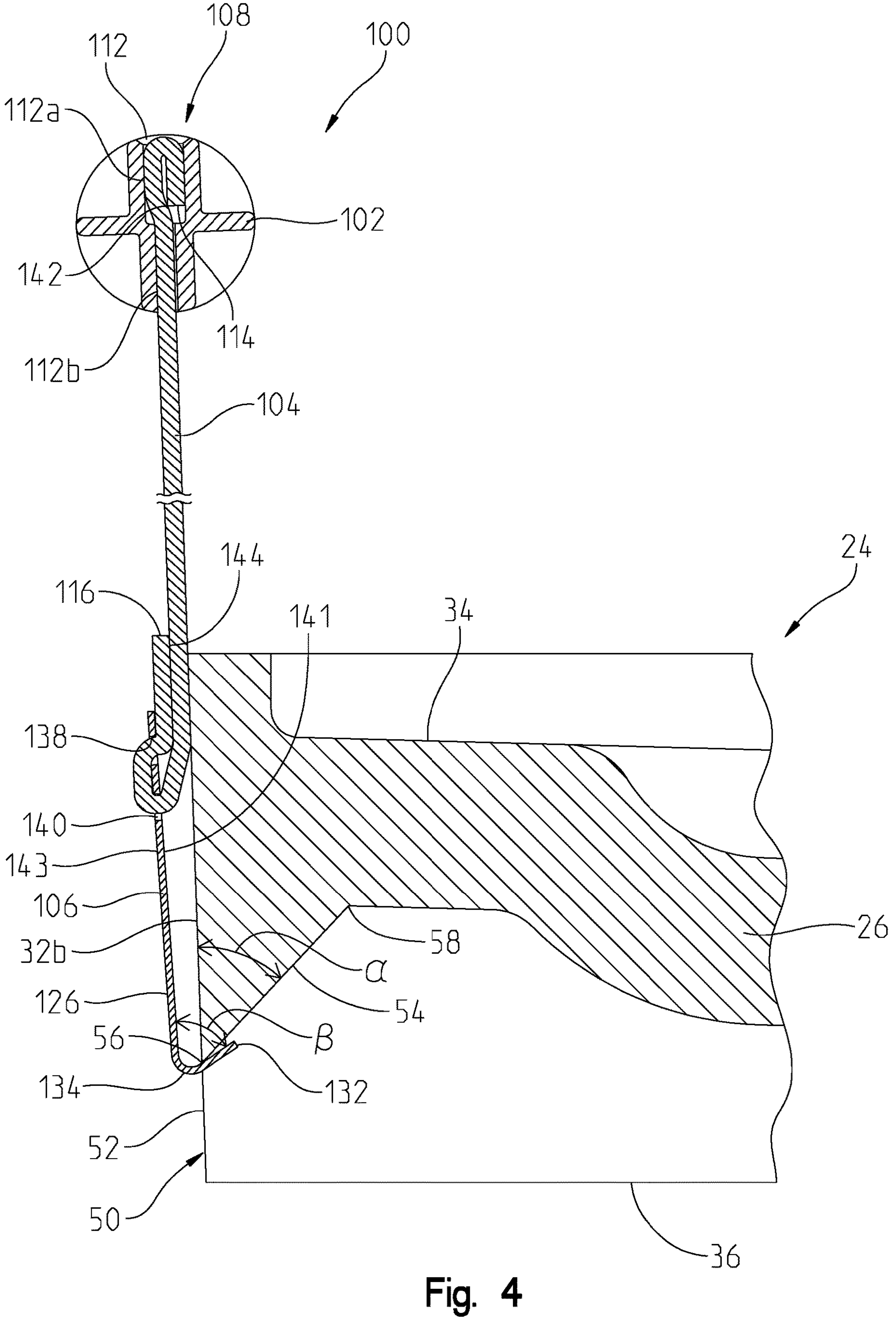
FIG. 4 is a cross-sectional view of the installation tool and the shower base taken at line 4-4 of FIG. 3.

FIG. 4 shows installation tool 100 engaged with recess 50 of shower base 22. Recess 50 creates an opening 52 extending vertically upward from lower surface 36 and terminates at an upper point or edge 56 that is at a distance less than the height of peripheral edge 32*b* at upper surface 34. Material of body 26 begins to angle starting at upper point 56 creating angled surface 54. Angled surface 54 extends from upper point 56 upwardly toward upper surface 34 of shower base 22. For aesthetic purposes, recess 50 is illustratively only included on two peripheral edges 32*a*, 32*b* of shower base periphery 30. This prevents visibility of the recesses 50 to a user in both a two-wall and three-wall shower enclosure configuration. In some illustrative embodiments, peripheral edges 32*a*, 32*b* of shower base periphery 30 may each include more than one recess 50 for installation versatility.

Figure 6:
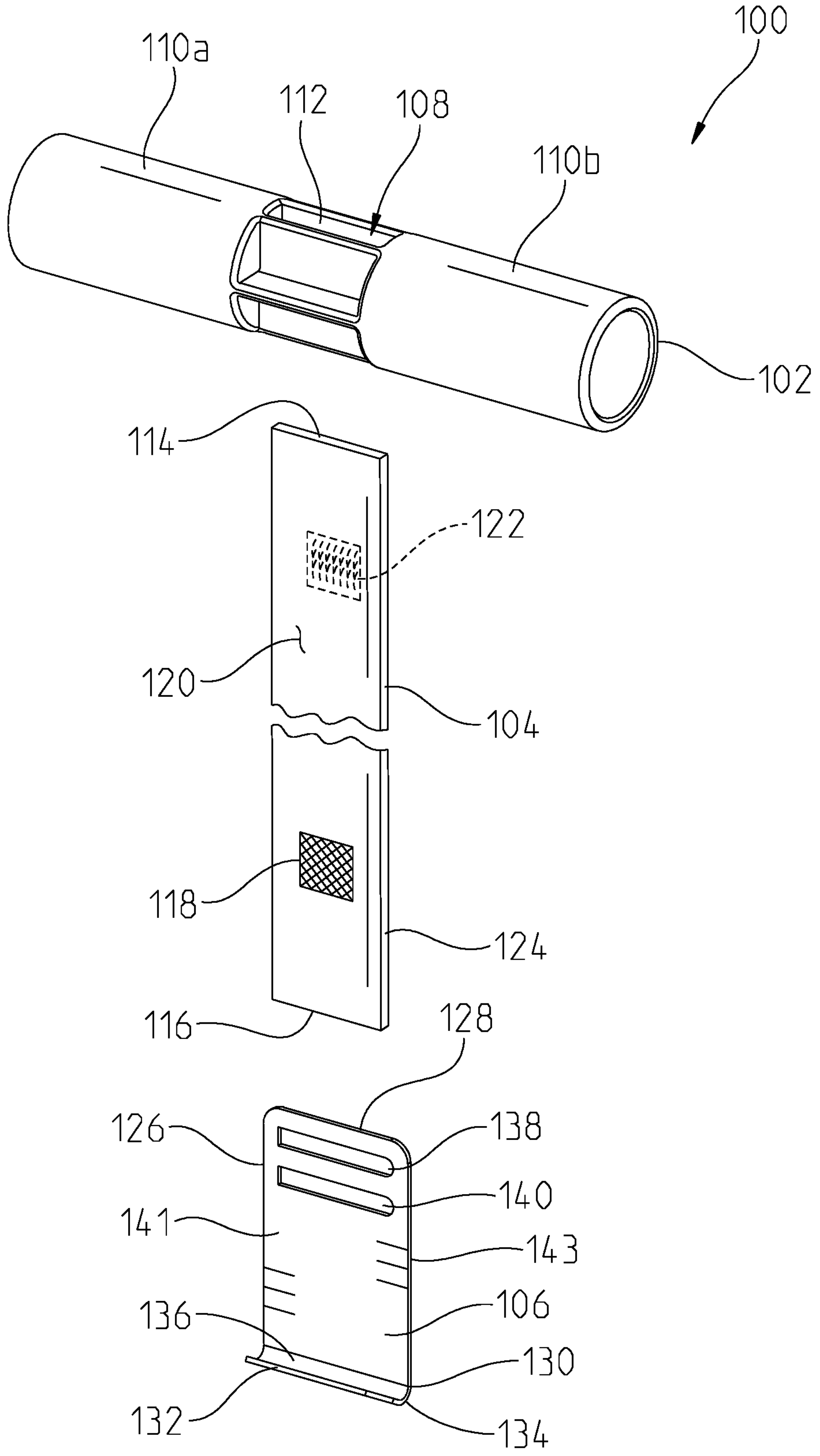
FIG. 6 is an exploded perspective view of the illustrative shower base installation tool of FIG. 2.

With reference to FIGS. 4 and 6, hook 106 illustratively includes a shank 126, a bend 134, and an angled return leg 132. Shank 126 includes an upper end 128 and a lower end 130. Bend 134 couples the lower end 130 with return leg 132. Bend 134 defines an inwardly facing crook 136. Angled return leg 132 engages with angled surface 54 of recess 50 to engage the installation tool 100 on shower base 22. To ensure engagement, bend 134 of hook 106 is at an angle $\beta$ which is larger than the angle $\alpha$ of angled surface 54 relative to peripheral edge 32*b* of shower base 22. Illustratively, the difference between angle $\beta$ and angle $\alpha$ is between 10° and 20°. In one illustrative embodiment, the difference between angle $\beta$ and angle $\alpha$ is 15°. Illustratively, angle $\beta$ is between 20° and 80° (e.g., approximately 60°), and angle $\alpha$ is between 10° and 70° (e.g., approximately 45°). In an illustrative embodiment, the hook 106 is made from a rigid material configured to support at least 200 lbs. without breaking or permanently deforming (e.g., no plastic deformation). Illustratively, the hook 106 is formed of a metal (e.g., stainless steel). In one illustrative embodiment, hook 106 is approximately 0.03 inches thick.

Hook 106 illustratively includes an upper closed slot 138 and a lower closed slot 140 to attach strap 104 to hook 106. The bottom end 116 of strap 104 is illustratively inserted through the lower closed slot 140 from a proximal side 141 of the shank 126 closest to shower base 22 through to the distal side 143 of shank 126 farthest from shower base 22. Bottom end 116 is then inserted through upper closed slot 138 from the distal side 143 of shank 126 farthest from shower base 22 to the proximal side 141 of the shank 126 closest to shower base 22. Bottom end 116 is pulled upward and secured in place between strap 104 and hook 106. During installation, strap 104 is illustratively clamped between shower base 22 and hook 106 and thus further secured in place. In one illustrative embodiment, strap 104 may include a releasable coupler 144 such as a hook and loop fastener, a snap, adhesive, etc. to further secure bottom end 116. The strap 104 is illustratively formed of a flexible material having a strength sufficient to lift at least 200 lbs. without breaking or overly stretching (e.g., no plastic deformation). In an illustrative embodiment, strap 104 is flexible and made from polyester, cotton, mesh nylon, etc. In one illustrative embodiment, strap 104 is 0.75 inches wide and 0.09 inches thick.

Handle 102 illustratively includes a coupler 108 for securing the strap 104 thereto. Coupler 108 is illustratively defined by a vertical slot 112. The upper portion 112*a* of vertical slot 112 is wider than the lower portion 112*b* of vertical slot 112. In an illustrative embodiment, handle 102 is made from a rigid material, such as a polymer (e.g., a styrene), die cast zinc or aluminum.

To attach strap 104 and handle 102, top end 114 of strap 104 is inserted up through both the lower portion 112*b* and the upper portion 112*a* of vertical slot 112. Top end 114 is then folded onto strap 104 and pushed back through only upper portion 112*a* and secured in place by friction. Securing member 142 may couple folded top end 114 to strap 104, and may be a permanent form of securement such as stitching or adhesive.

During installation, shower base 22 is lowered into shower enclosure 10. An adhesive may be applied to lower surface 36 of shower base 22. While hook 106 is engaged with recess 50, a user pulls handle 102 up and away from shower base 22 resulting in tension in strap 104. The user can then lower shower base 22 to align first peripheral edge 32*a*, second peripheral edge 32*b*, and third peripheral edge 32*c* flush with first shower wall 12*a*, second shower wall 12*b*, and third shower wall 12*c* of shower enclosure 10, respectively.

Figure 5:
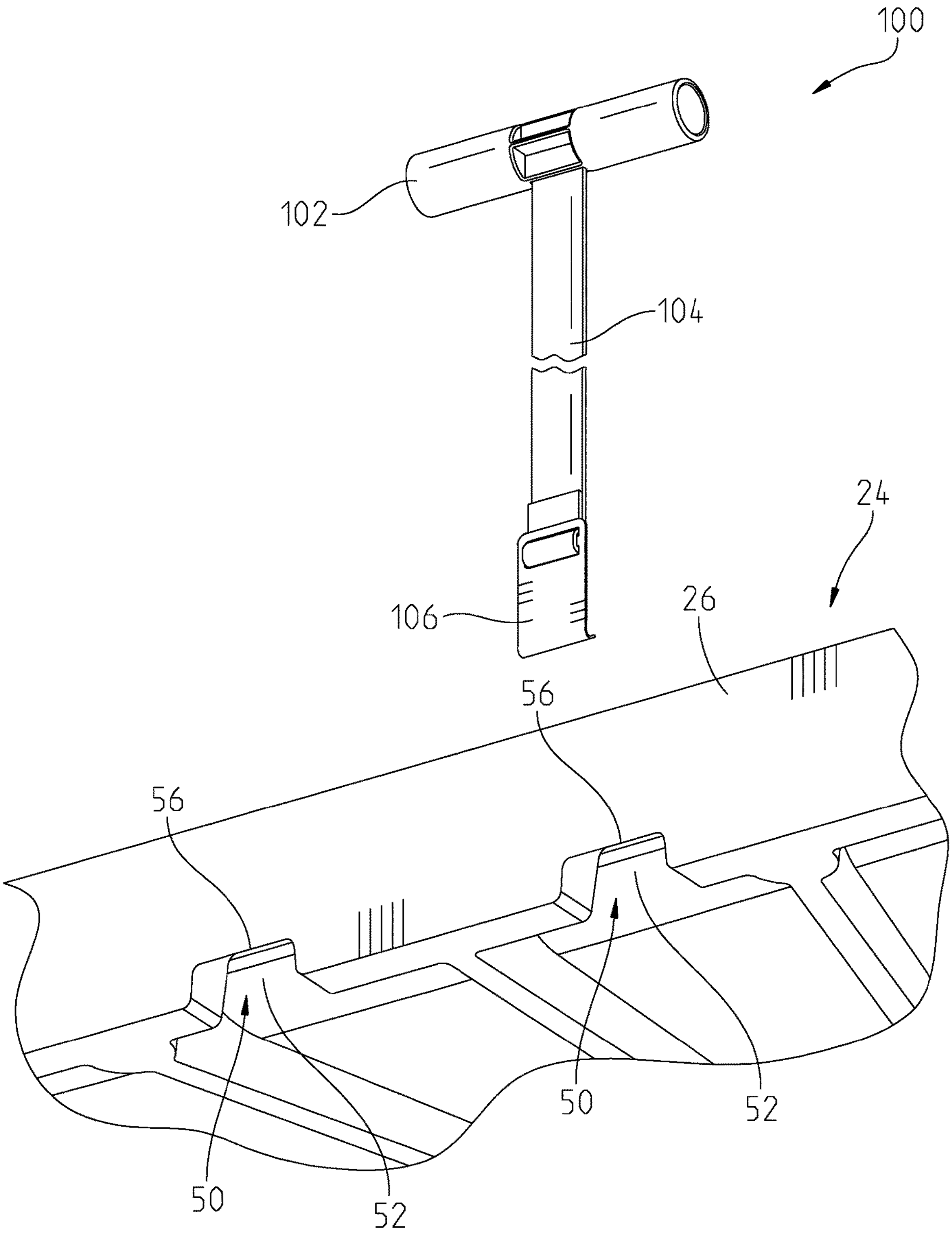
FIG. 5 is a perspective view of the shower base installation tool of FIG. 2 and recesses to receive the tool in the shower base of FIG. 1.

Following installation of shower base 22, tension on strap 104 may be released such that lower end 116 may be release from hook 106. Hook 106 may either be removed from the shower enclosure 10 or remain in place. FIG. 5 shows installation tool 100 and shower base 22 in a disengaged mode, illustratively before installation of the shower base 22.

As shown in FIG. 6, some embodiments of handle 102 may include opposing grip portions 110*a*, 110*b* to help a user attain better grip and prevent slippage when using installation tool 100. Additionally, some embodiments of strap 104 may include an attachment mechanism such as a hook and loop fastener, including a hook portion (rough side) 118 supported by a first side 120 of strap 104, and a loop portion (soft side) 122 supported by a second side 124 of strap 104. When hook portion 118 and loop portion 122 are pressed together, the two parts stick to each other. Illustratively, hook portion 118 and loop portion 122 are attached to strap 104 on opposing sides 120 and 124. Installation tool 100 can become more compact for storage by rolling hook 106 and strap 104 around handle 102 and pressing hook portion 118 and loop portion 122 together, thus securing installation tool 100 in a stored mode.

Figure 7:
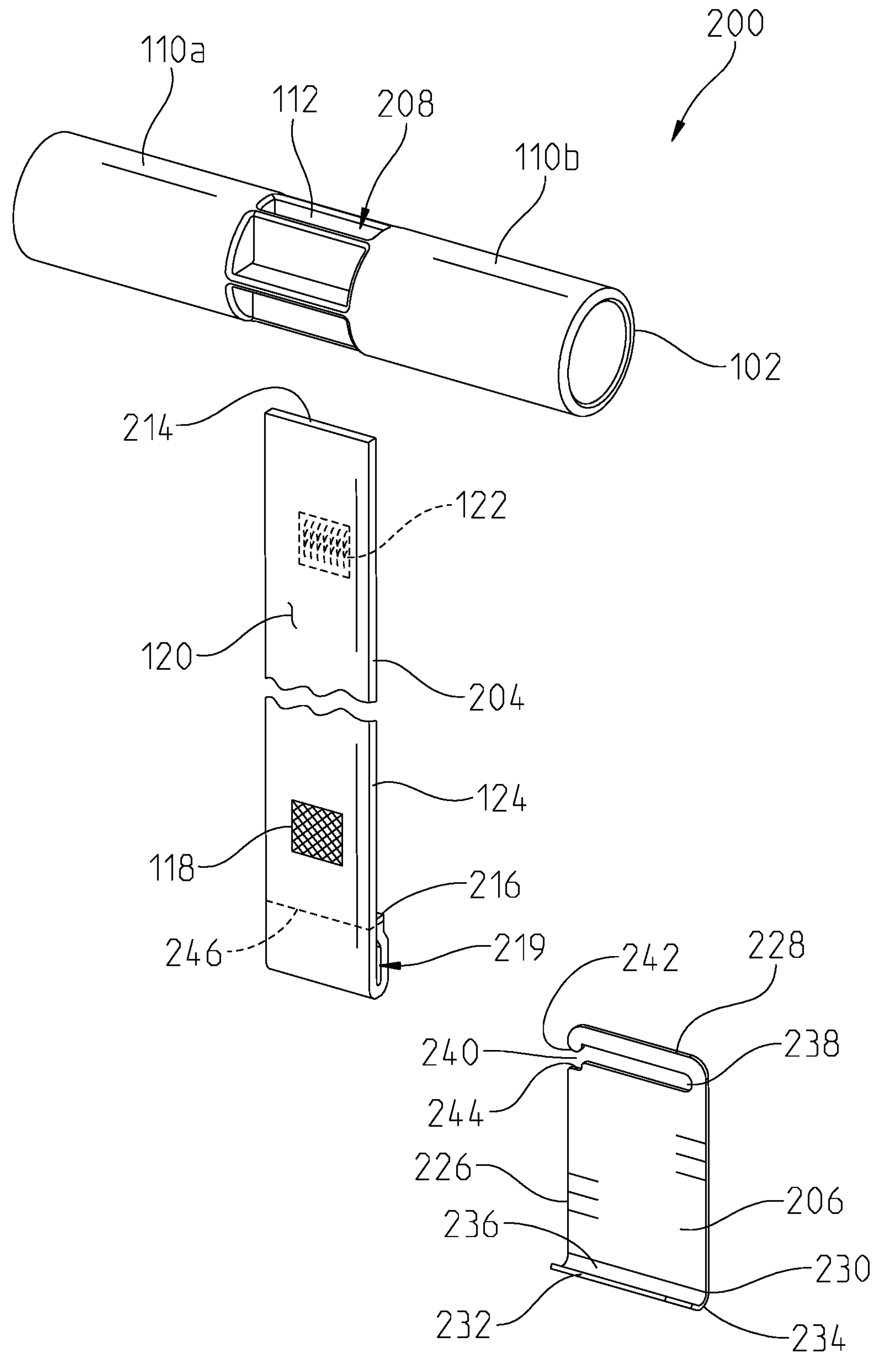
FIG. 7 is an exploded perspective view of a further illustrative shower base installation tool.
Figure 8:
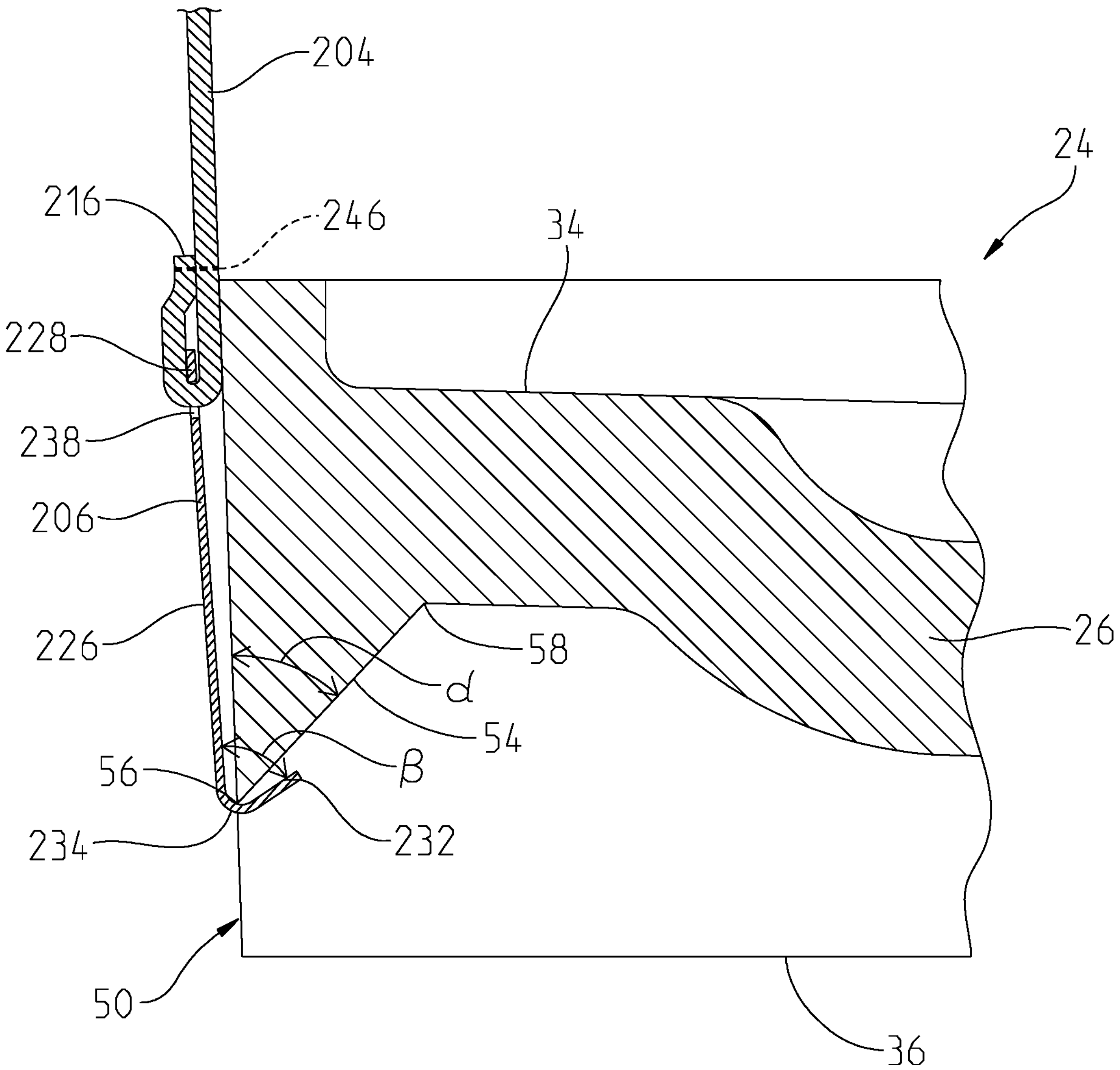
FIG. 8 is a cross-sectional view of the installation tool and the shower base of FIG. 7 similar to the cross section show in FIG. 4.

FIGS. 7-8 show a second embodiment of installation tool 200. Identifying reference numbers are retained from previous figures for components that are similar between installation tool 100 and installation tool 200. Installation tool 200 includes a handle 102, a strap 204, and a hook 206. Handle 102 is the same as defined above for installation tool 100. Strap 204 includes a top end 214 and bottom end 216. Top end 214 and handle 102 are attached in the same manner as described above. Bottom end 216 is folded and permanently attached to strap 204 by conventional means of fastening, such as stitching or adhesive, at a securing line 246. This attachment forms a receiving opening 219.

Hook 206 includes a shank 226 with an upper end 228 and a lower end 230. Bend 234 couples the lower end 230 with return leg 232. Bend 234 defines an inwardly facing crook 236. An open slot 238 creates a cantilevered arm 241 at the top of hook 206. Strap 204 is releasably coupled to hook 206 by inserting cantilevered arm 241 through opening 219. Tab 242 is a protrusion at the end of cantilevered arm 241 and helps to ensure strap 204 remains engaged to hook 206. Hook 206 also includes a notch 244 at the open end of open slot 238 opposite tab 242 that allows for easier insertion and removal of cantilevered arm 241 into or out of opening 219.

Installation tool 200 engages with recess 50 of shower base 22 in the same way as previously described above with respect to installation tool 100 to facilitate installation of shower base 22 into shower enclosure 10.

Although the invention has been described in detail with reference to certain preferred embodiments, variations and modifications exist within the spirit and scope of the invention as described and defined in the following claims.

What is claimed is:

1. A shower base installation tool cooperating with a shower base, the shower base installation tool comprising:
- a handle;
- a flexible strap having a top end and a bottom end;
- a hook including:
  - a shank extending between an upper end and a lower end;
  - an angled return leg;
  - a bend coupling the lower end of the shank with the return leg, the bend defining an inwardly facing crook; and
  - an opening at the top end of the shank;
- wherein the distance from the upper end of the shank to the inwardly facing crook is less than a height of the shower base;
- wherein the top end of the strap is coupled to the handle;
- wherein the bottom end of the strap is releasably inserted through the opening of the hook; and
- wherein the inwardly facing crook of the hook engages an angled surface of at least one recess in the shower base.

2. The shower base installation tool of claim 1, wherein the opening of the hook includes an upper slot and a lower slot.

3. The shower base installation tool of claim 1, wherein the angled bottom end extends away from the shank at an acute angle.

4. The shower base installation tool of claim 1, wherein the handle includes a vertical slot receiving the top end of the flexible strap.

5. The shower base installation tool of claim 4, wherein the vertical slot in the handle includes an upper portion and a lower portion, the upper portion being wider than the lower portion.

6. The shower base installation tool of claim 1, wherein the handle is formed of a rigid material, and the strap is formed of a flexible material.

7. The shower base installation tool of claim 1, wherein the hook is configured to support at least 200 lbs.

8. The shower base installation tool of claim 1, wherein the opening of the hook is a slot open on one end and defining a cantilevered arm above the slot.

9. The shower base installation tool of claim 8, wherein the cantilevered arm has a tab extending downward at the opening of the open slot.

10. The shower base installation tool of claim 9, wherein the bottom of the open slot includes a notch cooperating with the tab.

11. A shower base installation system comprising:
- a shower base installation tool including:
  - a handle;
  - a flexible strap having a top end and a bottom end;
  - a hook including:
    - a shank extending between an upper end and a lower end;
    - an angled return leg;

a bend coupling the lower end of the shank with the return leg, the bend defining an inwardly facing crook; and an opening at the top end of the shank;

wherein the top end of the strap is coupled to the handle; and wherein the bottom end of the strap is inserted through the opening of the hook;

a shower base including;

a body including:

a first peripheral edge;

a second peripheral edge extending perpendicular to the first peripheral edge;

an upper surface extending between the first peripheral edge and the second peripheral edge; and a lower surface extending substantially parallel to the upper surface; and at least one recess formed in at least one of the first peripheral edge and the second peripheral edge, the at least one recess including:

an opening extending upwardly from the lower surface of the body to an upper edge at a distance less than the upper surface of the body; and an angled surface extending from the upper edge of the opening and angled upwardly toward the upper surface of the body; and wherein the inwardly facing crook of the hook engages the angled surface of the at least one recess in the base.

12. The shower base installation system of claim 11, wherein the opening of the hook includes an upper slot and a lower slot.

13. The shower base installation system of claim 11, wherein the angled bottom end extends away from the shank at a first angle, and the angled surface of the base is at a second angle from vertical, wherein the first angle is between 10 to 20 degrees greater than the second angle.

14. The shower base installation system of claim 11, wherein the handle includes a vertical slot receiving the top end of the flexible strap, wherein the vertical slot includes an upper portion and a lower portion, the upper portion being wider than the lower portion.

15. The shower base installation system of claim 11, wherein the handle is formed of a rigid material, and the strap is formed of a flexible material.

16. The shower base installation system of claim 11, wherein the hook is configured to support at least 200 lbs.

17. The shower base installation system of claim 11, wherein the opening of the handle is a slot open on one end and defining a cantilevered arm above the slot.

18. The shower base installation system of claim 17, wherein the cantilevered arm has a tab extending downward at the opening of the open slot.

19. The shower base installation system of claim 18, wherein the bottom of the open slot includes a notch cooperating with the tab.

20. The shower base installation system of claim 11, wherein the base is made from ceramic.

* * * * *